Jan. 31, 1961 E. BRUCE 2,970,310
LIGHT PULSE GENERATOR
Filed Sept. 23, 1947 2 Sheets-Sheet 2
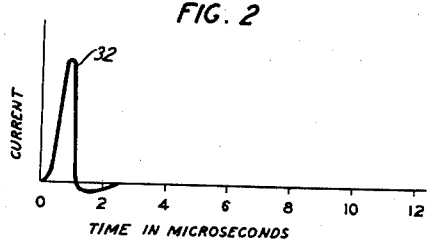
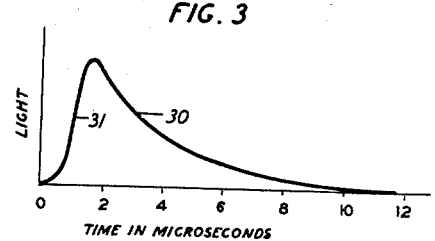
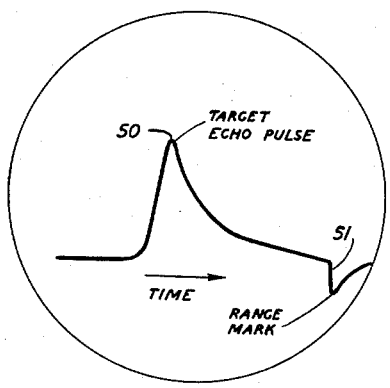
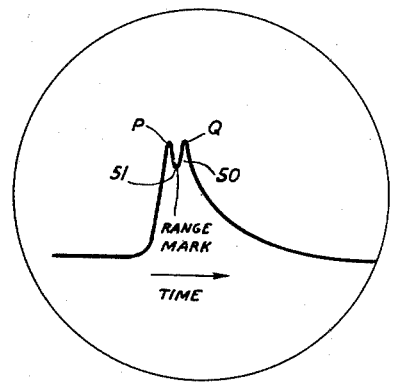
INVENTOR
E. BRUCE
BY Hugh S. Wertz
ATTORNEY

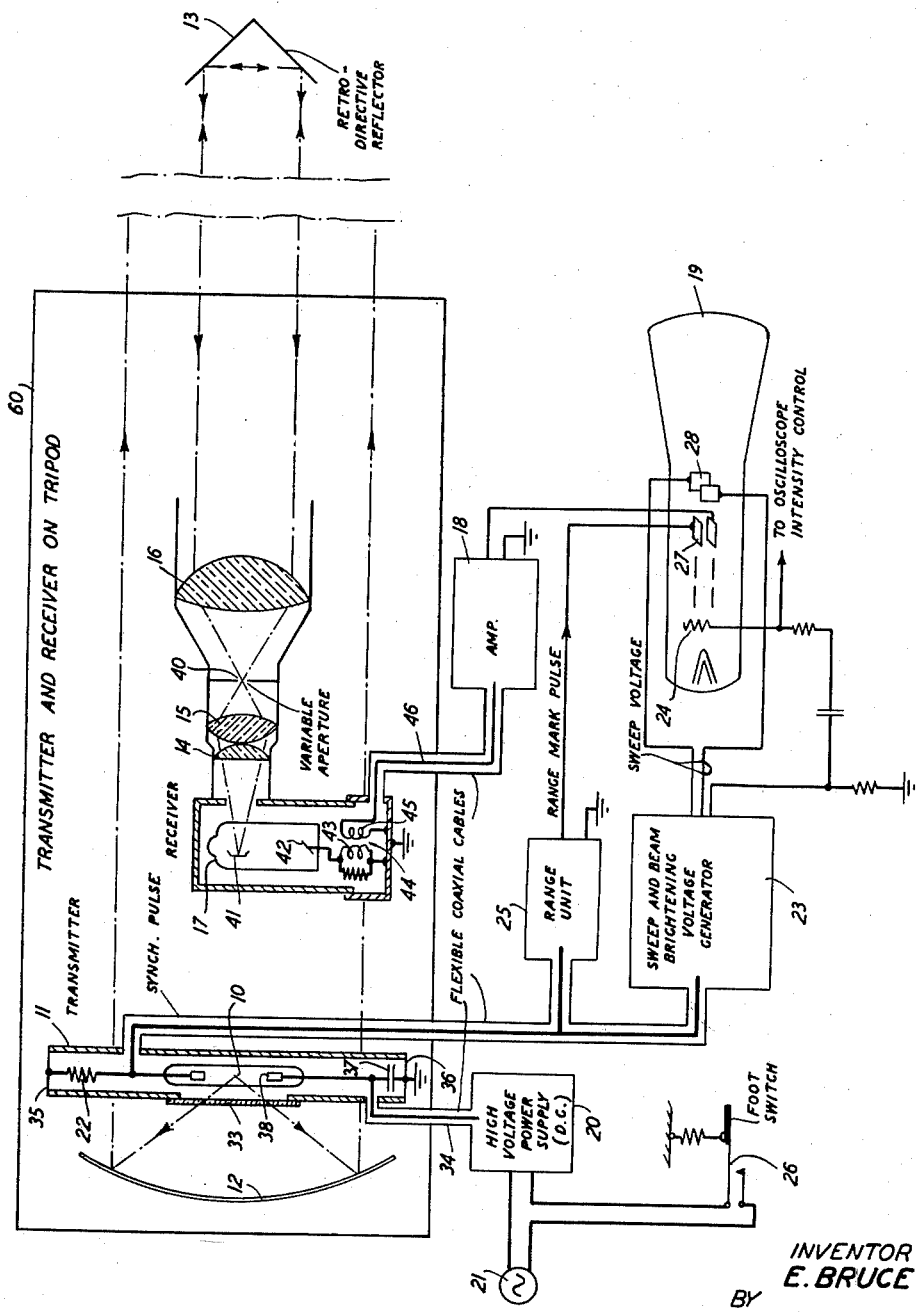

2,970,310
LIGHT PULSE GENERATOR

Edmond Bruce, Red Bank, N.J., assignor to Bell Telephone Laboratories, Incorporated, New York, N.Y., a corporation of New York Filed Sept. 23, 1947, Ser. No. 775,685

3 Claims. (Cl. 340—366)

This invention relates to object locating and distance and direction measuring systems and more specifically to a light pulse generator for use in such systems.

The term "light" as used herein is intended to be descriptive of radiations in both the visible and invisible portions of the spectrum. While the invention will be described below with particular reference to an arrangement employing visible or invisible light radiations, it is to be understood that in certain of its aspects the invention is not so limited but is applicable to use with other types of radiations as well.

Object locating systems employing radio waves, frequently called "radar" systems, are well known. In such systems, ultra-short carrier waves modulated with spaced pulses are directively emitted in a known direction from a transmitting station and are caused to strike objects within a particular region, causing echoes or reflections therefrom which are received after an interval of travel time by a receiving system at the transmitting point. After detection, various echo pulses produced by the reflections of the transmitted pulses from objects at various distances from the transmitting point are observed along a time coordinate on the screen of a cathode ray oscilloscope along with a pulse corresponding in time to the emission of the transmitted pulse (or spaced by a predetermined interval therefrom). The magnitudes of the pulses are indicated by displacements of the beam in the cathode ray oscilloscope perpendicular to the direction of time scanning. The time interval between the transmitted and received pulse is a measure of the distance of the object.

While radar systems are, in general, very satisfactory, there are occasions when it is not desirable to use them. As one example, there are times when it is desirable for a ship or other device employing a radar to maintain both radio and radar "silence" in order not to inform the enemy of its location. The present invention in one of its aspects relates to a device of the object location, or range, and direction finding class which does not utilize radio waves.

It is accordingly an object of this invention to provide a novel and improved object location system which does not require the use of radio waves.

It is another object of this invention to provide an object location system employing radiations falling within the infra-red, visible, and/or ultra-violet wavelength bands.

In accordance with a specific illustrative embodiment of the invention, infra-red light rays are used. A light pulse from a flash-lamp is reflected by a paraboloidal mirror and directed toward a target, which is preferably a retrodirective reflector, and echoes or reflections therefrom are picked up by a receiver optical system and applied to a photomultiplier. The amplified output of the photomultiplier is applied to the vertical deflecting plates of a cathode ray oscilloscope, and to the horizontal deflecting plates of the oscilloscope is applied a time sweep wave initiated by a synchronizing pulse produced at the same time as the light pulse. This synchronizing pulse is also utilized to produce a range mark of known time delay for indicating the distance to the target, in a manner similar to radar practice. A fairly wide light beam is allowed to reach the photomultiplier when the beam is used to search for the target, but, when the target is located, the size of the beam which reaches the photomultiplier is stopped down to make the direction indication more accurate and to reduce the effect of background "noise" by a large amount. The flash-lamp is coaxially mounted in a metal housing to neutralize external magnetic fields and to eliminate spurious electrical pick-up by other components of the device.

The invention will be more readily understood by referring to the following description taken in connection with the accompanying drawings forming a part thereof in which:

Fig. 1 is a schematic diagram of an object locating and distance measuring system employing light radiations; and Figs. 2 to 5, inclusive, are diagrammatic and graphical representations to aid in understanding the invention.

Referring more specifically to the drawings, Fig. 1 shows, by way of example for purposes of illustration, an object locating and distance measuring system employing visible or invisible light rays. When infra-red light is used, the system is frequently called an "irrad." The system comprises a flash-lamp 10 mounted within a housing 11 for producing infra-red radiations, a paraboloidal mirror 12 for directing radiations from the lamp 10 upon a target 13, shown as a retrodirective reflector which reflects some of these radiations back to a receiver, coaxial with the transmitter, comprising an optical system, including the lenses 14, 15 and 16, which focuses the radiations upon the cathode of a photomultiplier 17, and electric circuit means to be now described. The output of the member 17 is applied through an amplifier 18 to one plate of a pair of vertical deflecting plates 27 in a cathode ray tube 19. Direct current for the flash-lamp is supplied by condenser 37 which is charged by means of a high voltage direct current power supply 20 receiving alternating power for rectification from a suitable alternating current source 21. A synchronizing pulse for each flash of the lamp is produced across a resistor 22 connected in series with the lamp 10 and this pulse is utilized to initiate a time sweep wave in a circuit 23 and also to produce a voltage which can be applied to the control element 24 of the cathode ray tube 19 to "unblank" the blocked-off beam for the duration of the sweep. A suitable sweep and beam brightening (unblanking) circuit is disclosed in United States Patent 2,519,278 of August 15, 1950, to B. M. Oliver. The sweep circuit output is applied to a pair of horizontal deflecting plates 28. This synchronizing pulse is also applied to a range unit 25 to produce a range mark pulse of known time delay which is applied to the other of the pair of deflecting plates 27, the output circuits of the amplifier 18 and of the range unit 25 and the pair of deflecting plates 27 being connected in a series circuit so that the range mark pulse optionally is either added to or subtracted from the amplified received pulse of corresponding time delay depending on the polarities of the pulses. A suitable range unit is disclosed in an article entitled "The SCR-584 Radar" in the February 1946 issue of "Electronics" beginning on page 110.

The flash-lamp 10 is adapted to be used, for example, with a direct voltage of about 5,000 volts which voltage is produced by the power supply 20 which can be of any well-known type, either regulated or unregulated. The lamp 10 utilizes nearly pure xenon gas which has proved to be richer infra-red content than krypton, argon or neon. Tungsten or alloyed tungsten-nickel, barium electrodes are employed for good life under the "irrad" operating conditions of high current at 60 pulses per second, each of about one microsecond duration, in spurts of several seconds as controlled by the foot switch 26, for example. Typical shapes of flash-lamp current and resulting light pulses are indicated in Figs. 2 and 3, respectively, each of which is plotted versus time in microseconds. In the tube represented by the curve of Fig. 3, there is a long tail of light 30 following the initial increase in amplitude 31 although in the current curve represented by the plot of Fig. 2 there is no such tail. Under clear atmospheric conditions, this tail does little harm to the accuracy of irrad measurements. However, when it is necessary to measure through heavy atmospheric mist with its spurious back-scattering, the unstable long tail reflected from nearby mist interferes seriously with reception from the more distant target, particularly when they are comparable in strength. This harmful effect can be greatly reduced by the adjustable aperture 40 in the receiver. This also improves the accuracy of direction indication, as previously referred to, so that the directional error does not exceed $\pm 2$ minutes of arc.

The flash-lamp housing 11 has a window 33 which exposes a section of the source located at the focal point of the precision, front surface, fairly large (such as, for example, 11 inches in diameter paraboloidal mirror 12 having, for example, a 4-inch focal length. This window 33 contains an appropriate light filter passing the infrared and eliminating the visible. If desired, a series of such filters having various cut-off wavelengths can be made available.

The flash-lamp 10 is mounted coaxially within the metal cylindrical tube housing 11. Since the housing provides the return path for the current which passes through the lamp (this circuit including the high voltage power supply 20, the coaxial or other cable 34, the lamp 10, resistor 22 and the housing 11), the coaxial arrangement of lamp and housing neutralizes powerful external magnetic fields and eliminates spurious electrical pick-up by other components of the irrad system. It also minimizes the inductance of the flash-lamp circuit which results in a brighter flash, a better pulse shape and greater freedom from electrical self-oscillations caused by the inherent negative resistance of the flash-lamp 10. The lamp housing also acts as a chimney for heat ventilation through top and bottom openings 35 and 36. The inner surface of the chimney is lined with black emery cloth to stop surface reflections of the light. Also within the chimney and above the lamp is the interconnecting non-inductive resistor 22 of a fraction of an ohm, for example, for assistance in neutralizing the negative resistance of the flash-lamp. This resistor, as pointed out above, also provides a voltage drop which can be utilized for triggering the range unit 25 and the sweep and beam brightening voltage generator 23 each time the lamp flashes.

At the base of the chimney and within the unit housing 11 is a condenser 37 of, for example, about 0.1 microfarad capacity. This condenser is connected between the chimney base and the adjacent terminal 38 of the lamp 10 with short heavy leads. The time constant of the series circuit comprising the condenser 37, flash-lamp 10, the damping resistor 22 and the connecting leads determines the duration (measured at one-tenth maximum amplitude) of the current pulse after the voltage breakdown of the flash-lamp. By way of example, this duration is about 1 microsecond as shown in Fig. 2. The peak current of the pulse varies between 400 and 1600 amperes, for example, depending on the flash-lamp being used and also its service age.

The light pulses produced by the lamp 10 and filtered by the member 33 are reflected by the paraboloidal mirror 12 and directed toward a target. Preferably the transmitter and receiver are mounted on a tripod so that they may be turned in any desired direction and aimed at the target.

The target 13 preferably comprises a retrodirective reflector such as the well-known triple mirror device the operation of which is disclosed in Patent 1,384,014 to Fessenden, issued July 5, 1921. The advantage of the retrodirective reflector is that it reflects back to the lens 16 substantially all rays striking it. When a retrodirective reflector (or a plurality of them combined as a unit) is used, it stands out distinctly regardless of neighboring objects or background. While a retrodirective reflector of the type employing three reflector mirror surfaces mutually perpendicular to one another is to be preferred, the system of Fig. 1 is operative with other forms of target, either good reflecting objects or diffusedly reflecting objects.

Since the retrodirective reflector 13 is substantially equivalent to a plane mirror perpendicular to the incident radiation, the portion of the light intercepted from the small source is reflected back to that source with a distribution over an area having approximately twice the linear dimensions of the equivalent mirror. Therefore by making the diameter of lens 16 about twice the breadth of reflector 13 practically no reflected light is lost whereas a diffuse reflector would contribute light at the receiver of only a magnitude inversely as the square of the distance. The system has been found to be effective at distances up to 7500 yards or more and the position of the mirror 13 can be located at such distances with a high degree of precision.

The large proportion of the rays reflected back from the target 13 and picked up by the lens element 16 are focussed through a variable aperture 40 without aperture loss to a lens system comprising the lenses 14 and 15 which function in well-known manner to focus them upon the first photoelectric cathode 41 of the tube 17 which, for example, is a multistage cesium-oxide photomultiplier tube. If infra-red radiations are used, this tube is constructed so that it is sensitive to infra-red. A photomultiplier system including the power supply therefore is shown in Patent 2,311,981, issued February 23, 1943, to Farnsworth.

The final anode 42 of the photomultiplier 17 is connected to the primary winding 43 of a transformer 44, the secondary winding 45 of which is connected to ground and through a suitable coaxial cable connector 46 to the amplifier 18. This amplifier can be of any suitable form for amplifying frequencies normally to be expected in signals of the character produced by the photomultiplier 17. The ungrounded terminal of the amplifier 18 is connected to one of the vertical deflecting plates 27, as pointed out above, while the other deflecting plate 27 is connected to the ungrounded terminal of the range unit 25. This causes the deflecting signal applied to the plates 27 to be the instantaneous sum or difference of the range mark pulse produced by the range unit 25 and the video output signal of the amplifier 18.

Figs. 4 and 5 show the images of the echo pulse 50 and of a negative range mark pulse 51, the former figure showing the range mark pulse not coincident with the peak of the echo (and thus not truly indicating range) while the latter figure shows a coincidence of the two pulses. Movement of the pulse 51 is obtained by moving the range dial of the range unit. The echo pulse is adjusted to a predetermined amplitude. When coincidence is obtained, as in Fig. 5, by adjusting the heights of peaks P and Q to equality, the reading of the range unit dial is a sensitive and accurate indication of the range to the target. The zero setting of the range unit was previously aligned in this same manner with the indication of the outgoing pulse adjusted to the mentioned predetermined amplitude. In this way, displacement errors due to dissymmetry in the shape of the transmitted pulse are avoided by cancellations. The direction of the target can be indicated by a dial on the tripod or other mounting for the equipment 50.

The operation of the arrangement shown in Fig. 1 will now be described. The apparatus shown in the large box 60 in Fig. 1 is mounted on a tripod and aimed in the general direction of the target which preferably is a retrodirective reflector such as that shown schematically as the element 13 of Fig. 1. Such a target may be mounted on a wall, chimney, cupola, ship, etc. or the target may be the wall, chimney, etc., itself. In general, the receiver should be adjusted by opening the iris diaphragm 40 so that its increased field of view will facilitate the search for the target. As soon as the target is located, the size of the field of view which is focussed by the lens system, comprising the elements 16, 15 and 14, upon the electrode 41 of the photomultiplier 17 is stopped down to make the directional scanning more accurate and reduce the effect of background noise (such as is produced by a large target area) by a large amount. The amplified signals produced by the photomultiplier are further amplified in the device 18 and applied to the vertical deflecting plates 27 along with the range mark pulse produced in the range unit 25 and initiated by the synchronizing pulse produced in the resistor 22 with each flash of the lamp 10. Assuming that the range mark 51 is in a position such as that shown in Fig. 4, that is, not coinciding with the target echo pulse 50, the dial in the range unit can be turned until the range mark pulse 51 coincides with the target echo pulse 50 in the manner shown in Fig. 5. When the oscilloscope shows such a registry of the two pulses 50 and 51, a reading of the range unit dial shows the range to the target. The sweep voltage to produce the horizontal deflection of the beam is produced by the sweep voltage generator 23, this apparatus also producing beam brightening or unblanking in well-known manner.

The arrangement of this invention has a number of advantages over radar equipment. For example, since there is no spurious pick-up between transmitter and receiver in the equipment described herein, no minimum range restriction is present, such as is encountered in radar, and no need is present for the slow recovering "transmit-receive box" which together with the pulse duration are often principal causes of that difficulty. Moreover, as pointed out above, no radio waves are given off which can be detected by the enemy in war time. Even if an enemy knew the methods employed, a high degree of protection is afforded by the radiated beam being only a fraction of a degree in angular width.

Various modifications can be made in the embodiment described above without departing from the spirit of the invention, the scope of which is indicated in the appended claims. For example, a lens system can be used in place of the paraboloidal mirror 12. Moreover, a mirror system can be used in place of the optical system comprising the lens elements 14, 15 and 16.

What is claimed is:

1. Means for producing short light pulses comprising a discharge-producing flash-lamp, a cylindrical, open-ended, metal casing surrounding said flash-lamp in such a manner that the respective longitudinal axes are vertical and coaxial, whereby the flash lamp is electrically shielded and heat ventilated, a non-reflective lining on the interior surface of said casing, a light filter window in one side only of said casing, and a light-directing member placed opposite said window in such a position that its focal point falls on a point in said lamp located in the discharge path thereof.

2. Means for producing short light pulses comprising a discharge-producing flash-lamp having electrodes, a cylindrical, open-ended, metal casing surrounding said flash-lamp in such a manner that the respective longitudinal axes are vertical and coaxial, whereby the flash lamp is electrically shielded and heat ventilated, a non-reflective lining on the interior surface of said casing, a light filter window in one side only of said casing, a light-directing member placed opposite said window in such a position that its focal point falls on a point in said lamp located in the discharge path thereof, means for applying a high voltage direct current to the electrodes of said flash-lamp, and a resistance in series with said means for producing a synchronizing pulse during each flash.

3. In a distance and direction indicating device in which electromagnetic pulses falling within the range of infra-red, visible or ultra-violet wavelength bands are produced and directed toward a target and reflections thereof are utilized to produce an indication of the distance and direction of said target, an electromagnetic pulse producing and directing means comprising a discharge-producing flash-lamp, a cylindrical, open-ended, casing coaxially mounted with respect thereto so that the two longitudinal axes are vertical and coincide, whereby the flash lamp is electrically shielded and heat ventilated, a non-reflective lining on the interior surface of said casing, and a paraboloidal mirror, said casing having a light filter window in one side only thereof adjacent to said paraboloidal mirror the focal point of which is positioned in the discharge path of said lamp.

References Cited in the file of this patent

UNITED STATES PATENTS

| | | |
|---|---|---|
| 1,384,014 | Fessenden | July 5, 1921 |
| 2,031,198 | Wright et al. | Feb. 18, 1936 |
| 2,158,405 | Coanda | May 16, 1939 |
| 2,337,745 | Garstang | Dec. 28, 1943 |
| 2,360,138 | Johnson | Oct. 10, 1944 |
| 2,409,030 | Fraenckel et al. | Oct. 8, 1946 |
| 2,442,506 | Morris | June 1, 1948 |
| 2,471,408 | Busignies | May 31, 1949 |
| 2,484,837 | Lake | Oct. 18, 1949 |

FOREIGN PATENTS

| | | |
|---|---|---|
| 470,846 | Great Britain | Aug. 23, 1937 |
| 846,239 | France | Sept. 12, 1939 |